United States Patent
Neuner

[11] 3,892,954
[45] July 1, 1975

[54] PROGRAMMABLE, TESTER FOR PROTECTION AND SAFEGUARDS LOGIC FUNCTIONS

[75] Inventor: James A. Neuner, Pittsburgh, Pa.

[73] Assignee: Westinghouse Electric Corp., Pittsburgh, Pa.

[22] Filed: Apr. 4, 1972

[21] Appl. No.: 241,049

[52] U.S. Cl.......................... 235/153 AC; 324/73 R
[51] Int. Cl. ............................................ G06f 11/00
[58] Field of Search..... 235/153 AC; 340/146.1 AB; 324/73 R

[56] References Cited
UNITED STATES PATENTS

| | | | |
|---|---|---|---|
| 3,248,721 | 4/1966 | Cockrell et al. | 235/153 AC |
| 3,562,644 | 2/1971 | De Wolf | 324/73 R |
| 3,579,102 | 5/1971 | Keating et al. | 324/73 R |
| 3,636,443 | 1/1972 | Singh et al. | 235/153 AC |
| 3,638,184 | 1/1972 | Beuscher et al. | 340/146.1 AB |

OTHER PUBLICATIONS
Baron and DuBois, Checking of Check Circuitry, IBM Technical Disclosure, Vol. 11, No. 11, April 1969, pp. 1398–1399.

Primary Examiner—Charles E. Atkinson
Attorney, Agent, or Firm—D. C. Abeles

[57] ABSTRACT

A programmable, tester for checking the proper operation of any of the basic protection and safeguards logic functions 1/1, 1/2, 1/3, 1/4, 2/2, 2/3 and 2/4. The m/n notation completely describes most required protection and safeguards logic functions in that n is the total number of inputs and m is the minimum number of those n inputs which must indicate a given logic state in order to cause a predetermined output. The tester simulates all possible logic input combinations and permutations and compares the logic functions output with that desired, providing an indication of a malfunction when a discrepancy is determined. Additional testing features assure the proper operation of the tester and provide the capability of sequentially testing a plurality of different logic functions.

7 Claims, 5 Drawing Figures

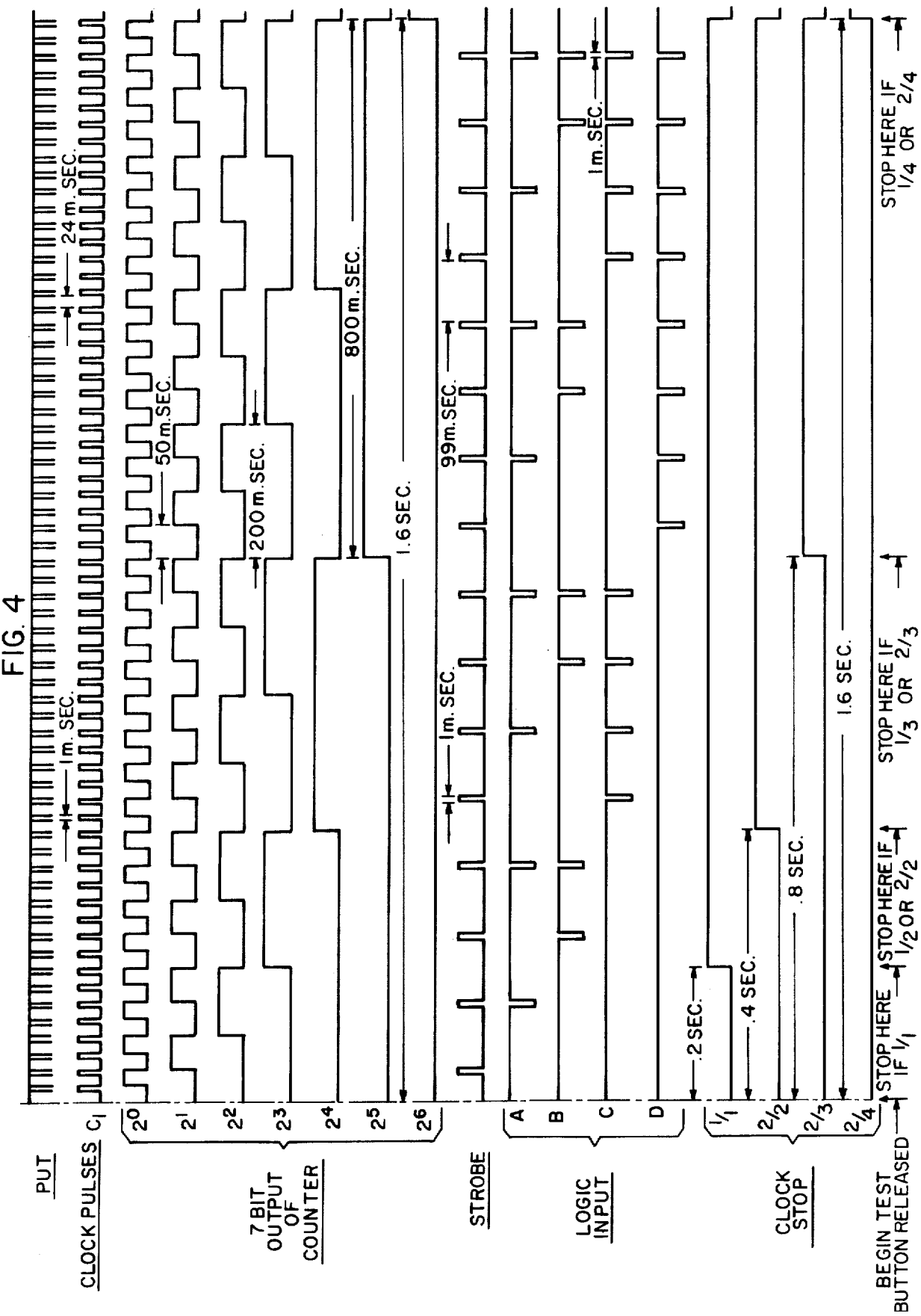

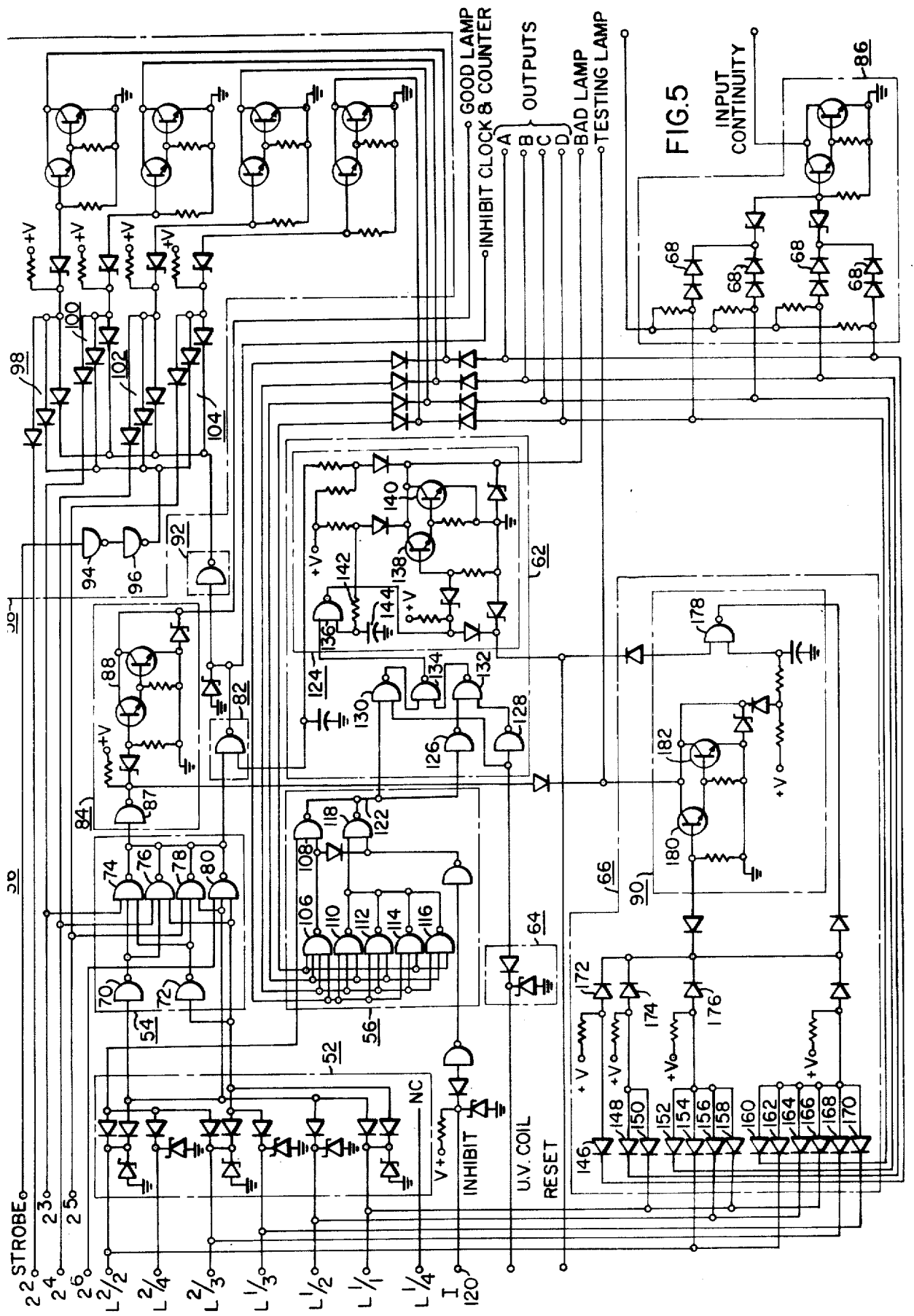

PROGRAMMABLE, TESTER FOR PROTECTION AND SAFEGUARDS LOGIC FUNCTIONS

CROSS REFERENCES TO RELATED APPLICATIONS

The present invention is related to the invention described in copending applications: Ser. No. 241,038 (Westinghouse Case 42,844), entitled "Universal Programmable Logic Function," filed Apr. 4, 1972; copending application Ser. No. 240,939 (Westinghouse Case 43,136), and entitled A Cycic "OR" Monitoring System for Displaying the Outputs of Two Substantially Similar Trains of Logic, filed Apr. 4, 1972 and application Ser. No. 240,938 (Westinghouse Case 43,135), entitled "Communication Between Redundant Protection and Safeguards Logic Systems within Nuclear Reactor Power Plants by Means of Light," filed Apr. 4, 1972. All the aforementioned applications have a common inventor in the inventor of the subject application and are assigned to the assignee thereof.

BACKGROUND OF THE INVENTION

The present invention pertains in general to protection and safeguards logic systems and more particularly to a programmable tester for checking the proper operation of such systems.

To assure the safe operating status of a nuclear power plant under fault conditions, all nuclear power plants must have some form of protection and safeguards system which meets the single failure criteria established by Governmental regulation.

The most common way in which to achieve this high degree of reliability is to construct two trains of logic that receive identical signals and produce the same logic functions. Each logic train incorporates a plurality of logic circuits for providing a variety of logic functions which receive inputs from the various monitoring sensors within and around the reactor and provide an actuation signal when desired, during fault conditions, to activate reactor protection and safeguards mechanisms such as the shutdown rods, containment sprays, safety injection systems, emergency diesel startups etc., which are employed to control such a condition. Since a plurality of reactor sensors monitor the same or related quantities, these logic functions require a predetermined number of sensor inputs to indicate a fault condition before the actuation mechanisms are energized. Each separate logic train can command a required actuation independent of the redundant train. The two logic trains are completely isolated, as previously described in copending application Ser. No. 240,938 (WE 43,135), electrically and physically, to eliminate the possibility that a single failure could destroy both trains simultaneously. However, the logic functions within each train must be periodically tested to minimize the possibility that identical, coincidental, undetected failures could occur within each system, resulting in the possible loss of a particular logic function.

In the existing electromechanical protection and safeguards logic systems that are presently employed, the required testing is accomplished manually. A large selector switch is used to connect pushbuttons to the various inputs of the logic function under test. A voltmeter or recorder indicates the operation of the undervoltage coils, intermediate of the actuation mechanisms, to the reactor plant operator. Lights are often employed to monitor the outputs of the safeguards logic function. All necessary combinations and sequences are performed by the operator while observing the voltmeter or paper recorder and the lights. The resultant relatively long duration of the test signals can cause an undesired actuation of the output devices, so bypass breakers have to be set to temporarily disconnect the actuation mechanisms and a total test of the system, comprising all possible combinations and permutations of input signals of the logic functions, is often abbreviated.

The resultant testing procedure is time consuming and, therefore, an expensive operation. Thus, the interval between tests is often scheduled as long as possible, thus diminishing the reliability by increasing the probability of a coincidental failure of identical components within each logic train. To minimize testing time, only combinations and sequences which could cause an actuation are normally tested. Those combinations and sequences which should not cause an actuation are normally deleted from the tests, leaving those functions in a possible state of potential failure. Additionally, because of the numerous logic functions to be tested, the operator can easily be confused resulting in an incomplete test of the system or an undesired actuation.

For increased reliability, at minimized cost, a simple, consistent, fast, complete and reliable test of every logic function within the protection and safeguards logic system is desired.

SUMMARY OF THE INVENTION

Briefly, this invention satisfies the aforementioned requirements by providing a programmable, tester as an integral part of each solid state protection and safeguards logic train. Selector switches are employed to move the inputs and outputs of the tester from one logic function to the next, and to program the tester to perform the required operation on the particular logic function under test. The tester once initiated, quickly produces all combinations of input signals at the function under test, while comparing the output of that function with a reference signal generated within itself. Any discrepancy between the output signal and the reference signal for longer than a predetermined time interval will result in a failure of the test. The input signals to the function under test, and consequently the output signals, are of short enough duration to avoid any undesired actuation of the safety and protection mechanism. This reduces wear on the output devices as well as minimizes the possibility of an undesired actuation in the event a bypass breaker is mistakenly omitted. In the exemplary embodiment to be described the test is performed by selecting a function to be tested by rotating a selector switch, initiating the test by momentarily pressing one button, and by the observation of three test lights. The first light indicates that the tester is performing the required test, while the second and third lights indicate at the end of the test, whether the logic function has passed or failed.

In its preferred embodiment the tester remains simple, since it is manually moved from function to function and initiated by the operator. This makes the check of the tester simpler and eliminates the possibility of undesired actuations as could occur under the failure of a continuously cycling tester.

BRIEF DESCRIPTION OF THE DRAWINGS

For a better understanding of the invention, reference may be had to the preferred embodiment, exemplary of the invention, shown in the accompanying drawings, in which:

FIG. 4 is a graphical illustration of the relative time sequence of signals generated by the tester of FIGS. 2 and 3; and FIG. 5 is a detailed schematic circuitry diagram of the tester components illustrated in FIG. 3.

DESCRIPTION OF THE PREFERRED EMBODIMENT

Within all nuclear power plants, some form of protection and safeguards system exists. The purpose of the system is to monitor specific points within the plant and under certain predetermined conditions to command the actuations required to protect both personnel and equipment. Since this system assures the safe operating status of nuclear power plants under fault conditions, it must be designed to meet the single failure criteria set by Governmental regulation. Accordingly, two trains of identical logic are provided which receive identical signals and control separate actuators. Each train is periodically tested to assure that no single failure can prevent the necessary actuations via both trains of logic. Additionally, the two logic trains are completely separated, electrically and physically, to assure that in the event of a single failure of either train, the other train will provide the necessary actuations.

Such a protection and safeguard logic system has previously been described in copending application Ser. No. 240,938 (Westinghouse Case 43,135), entitled "Communication Between Redundant Protection and Safeguards Logic Systems Within Nuclear Reactor Power Plants by Means of Light."

Figure 1:
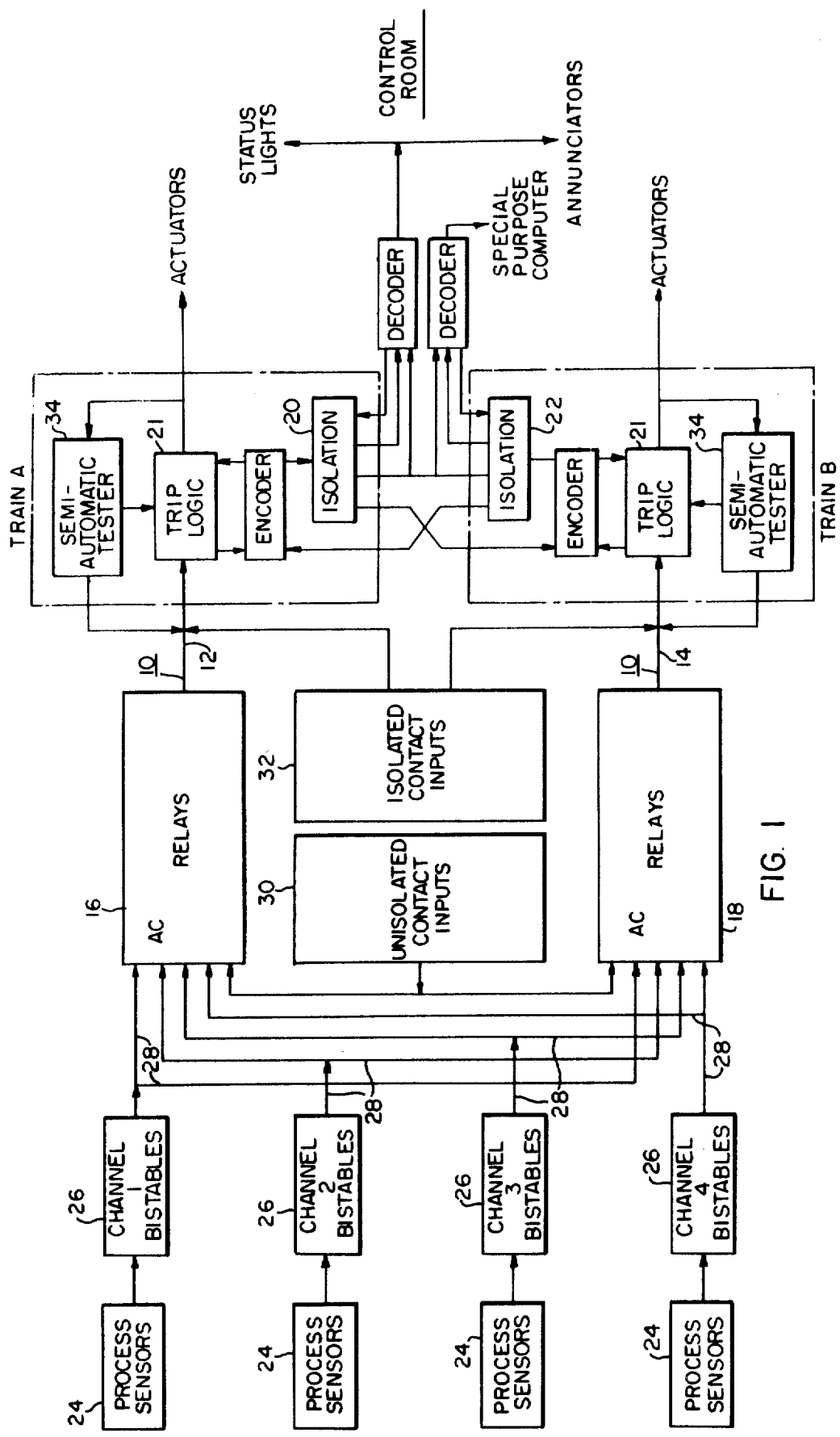
FIG. 1 is a system block diagram illustrating the general arrangement of elements comprising the protection and safeguards system of a nuclear reactor.

As an illustrative example, FIG. 1 provides a block diagram of a general arrangement of solid state protection and safeguards system components. The solid state reactor protection and safeguards logic system illustrated is composed of two identical, isolated, redundant trains of logic 10. Complete physical and electrical separation of the respective trains, denoted by corresponding reference characters 12 and 14, is accomplished by virtue of coil to contact separation provided by AC relays 16 and 18, photodiode coupled pairs, 20 and 22, and physical separation of wiring as generally illustrated.

Signals originating at the sensors 24 are in themselves redundant inasmuch as separate sensors are employed to monitor the same or related parameters. The analog signals produced by the process sensors 24 are converted to digital form by four channels of bistables 26. In order to maintain separation of the redundant signals, one signal output 28 from each bistable 26 controls two small AC relay coils, one within each of the respective AC relay units 16 and 18, corresponding to the two separate logic trains 12 and 14, respectively. The coil to contact separation of these AC relays assures separation of each bistable channel and each logic train from all others. The AC relays are grouped according to their bistable channel association within the separate AC relay units 16 and 18. In this way, separation of bistable to relay coil wires can be maintained. Signals originating at single contacts or solid state devices must enter each logic train via AC or DC relays 30, as if associated with a bistable channel, in order to maintain complete separation. Signals already existing at two isolated outputs (e.g. separate contacts) may be considered already isolated and be brought directly into each logic train as illustrated by isolated contact input block 32.

Each logic train receives exactly the same information. Upon the proper combination of inputs and sequence of events, as controlled by the trip logic circuitry 21, either logic train is capable of actuating the proper equipment to take corrective action as described in copending application Ser. No. 241,038 (Westinghouse Case 42,844).

In one exemplary embodiment this invention provides a manually initiated, programmable, semiautomatic tester 34 as an integral part of each logic train for the purpose of checking the proper operation of any of the basic logic functions employed within the trip logic 21. The tester simulates all possible logic input combinations and permutations and compares the logic functions output with that desired, providing an indication of a malfunction when a descrepancy is determined. Additional testing features assure the proper operation of the tester and provide the capability of sequentially testing each of the plurality of logic functions associated with the trip logic unit 21.

The semi-automatic testing unit 34, associated with each train, is employed periodically to check each train more thoroughly and faster than was previously possible. An alternate manual test is also provided. The use of a single universal logic board as described in copending application Ser. No. 241,038 (Westinghouse Case 42,844) to perform all trip logic, and the testing unit of this invention, simplifies system maintenance and improves reliability by minimizing testing and repair time. During normal operation, the testing unit is disconnected from the system avoiding any erroneous testing signals.

Figure 2:
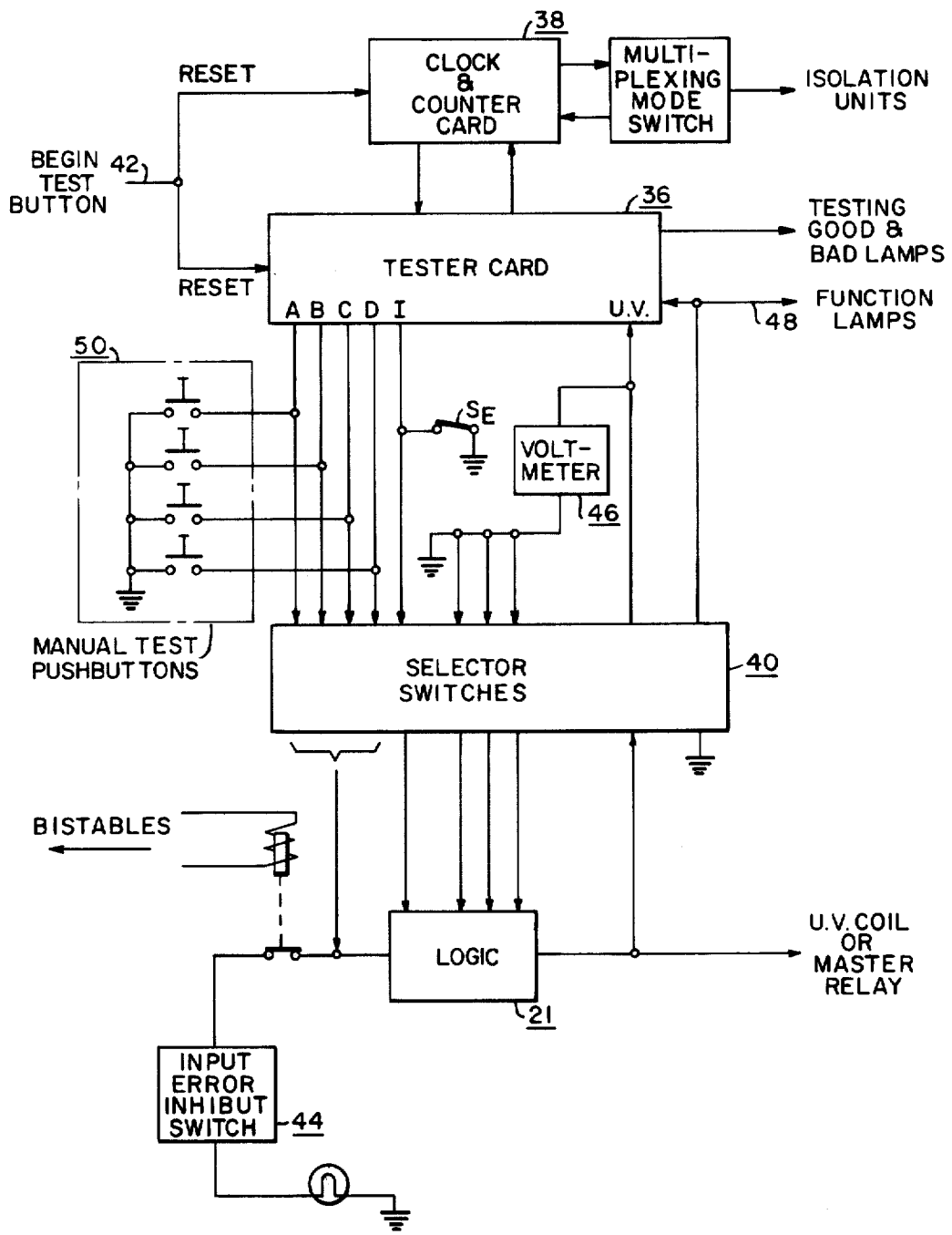
FIG. 2 is a block diagram illustrating the general arrangement of one embodiment of the tester of this invention.
Figure 3:
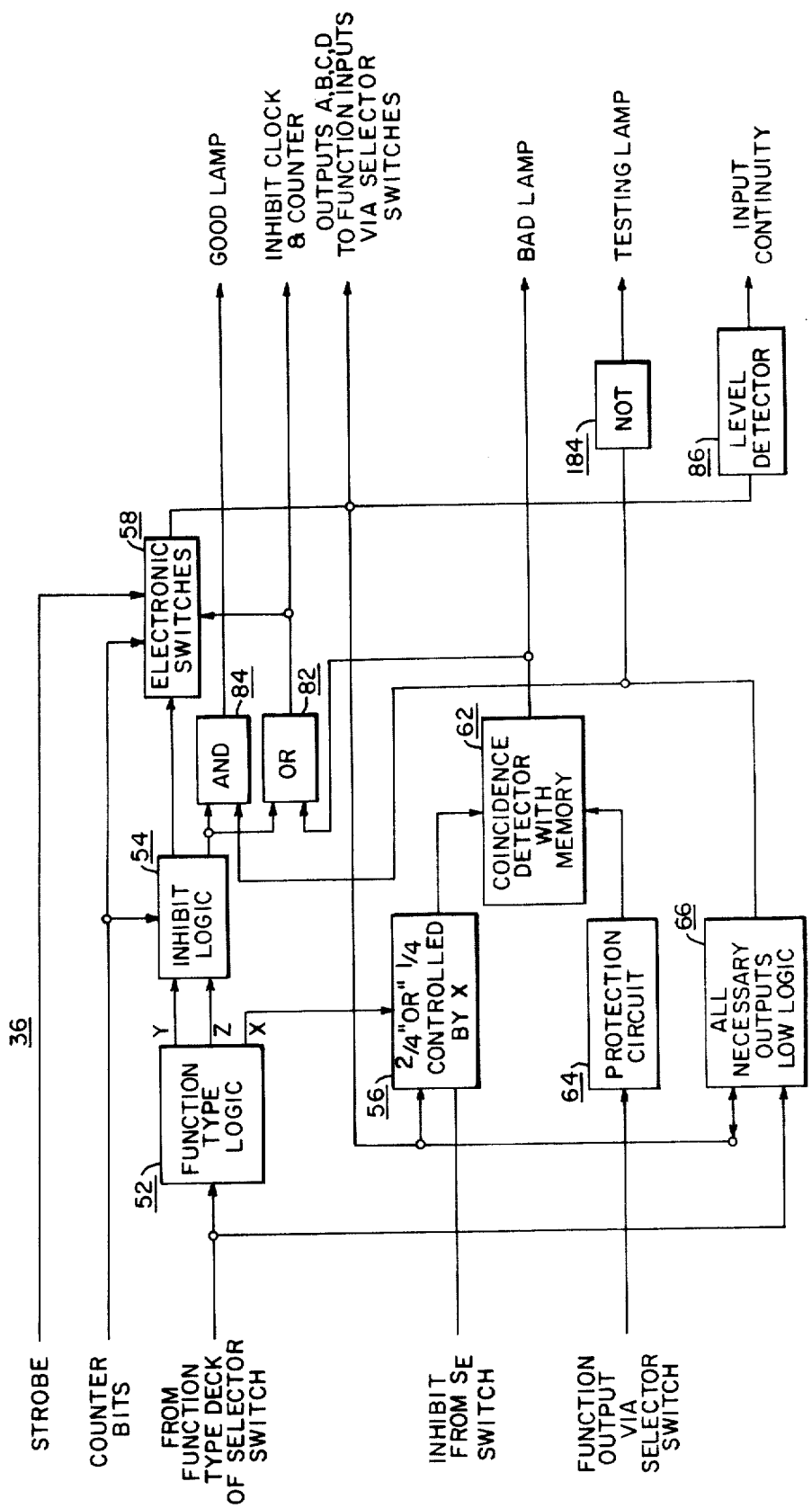
FIG. 3 is a block diagram illustrating a more detailed breakdown of the components of the tester of FIG. 2.

The semi-automatic testing unit 34 broadly comprises two units, one tester unit 36 and one clock and counter unit 38 and several switches, including in this exemplary embodiment, six ten-deck selector switches as illustrated in FIG. 2. A timing diagram graphically illustrating the signals associated with the testing unit and a general arrangement of the testing unit components are illustrated in FIGS. 4 and 3, respectively. A detailed schematic of the general test circuitry illustrated in FIG. 3, is provided in FIG. 5.

The semi-automatic tester, like any other critical function within the logic, must pass the single failure criteria set by Governmental regulation. This means that a failure of any given component or group of components, as a result of a single malfunction which can prevent reactor trip or safeguards actuation, must be detected during the periodic tests. Consequently, a single failure within the tester, which could prevent the detection of a single failure within the logic, must be detected during or before the periodic tests. A separate tester (designed to test the tester) is also inadequate since it would add complexity while suffering from the potential of having the same untested failures. Should a tester-tester be used, it could fail first in such a manner that a failure of the tester and, consequently, of other logic could go undetected. Additionally, complete manual testing of the tester is impractical, inasmuch as it would require too much time.

The strategy employed by this invention to solve the single failure problem, while simple in principle, adds increased reliability to the total reactor protection and safeguards system. Since an operator must be present to perform and record the tests, he is already available and is employed as the final judge of the functional integrity of the system as a whole. Every possible piece of information cannot be displayed to him in a short, reasonable amount of time. This would lead to confusion of the operator, resulting in mistakes. However, all necessary information, guaranteeing the integrity of the tester as well as the functional ability of the system, can be displayed in a consistent sequential manner. The tester, taken as a whole (including the tester unit, clock and counter unit, and switches), is designed in such a manner that any single failure which could prevent detection of a single failure within the logic system (whether of the same or different origin) will disclose itself as an incorrect sequence or combination of output signals to the operator at some time during the periodic tests. Whenever a failure within the tester is discovered, it must be repaired and the entire test reinitiated. In this way, the final tester of this system (including its semi-automatic tester) is the operator performing the tests.

A complete understanding of the invention will be had from the basic functional explanation of the tester presented below. A detailed description of the tester unit components will then follow to aid those skilled in the art in appreciating the many advantages of this invention.

In order to be sure that the semi-automatic tester of this exemplary embodiment will perform properly, at least one of the corresponding multiplexing mode switches associated with the respective logic trains 12 and 14 is set to what will hereinafter be referred to as the A + B function, which enables the tester clock and counter 38 to run continuously. The multiplexing mode switch is a three position switch which is normally maintained in a position that will "OR" the logic signal outputs from both trains so that if an actuation signal is provided by either train it will be monitored within the control room. The second position of the switch will inhibit the individual logic trains from being presented to the data readout in the control room. The third position of the multiplexing mode switch is for the A + B function, which enables the information from logic trains 12 and 14 to be presented in the control room in a cyclic manner as described in copending application Ser. No. 240,939 (Westinghouse Case 43,136). Next, the switch $S_E$, provided in the diagram of FIG. 2, is opened and all the selector switches 40 are maintained in their rest position, disconnecting all inputs and outputs. If the tester is operating properly, four visible red, light emitting diodes on the tester unit 36 will then illuminate. When the begin test pushbutton 42 is depressed a testing lamp within the logic train under test will illuminate and all of the four light emitting diodes, previously described, will turn off. Approximately 1.6 seconds after releasing the begin test pushbutton 42, the testing lamp will go off, and a good lamp within that logic train will come on and a bad lamp, also maintained within that logic train, will remain off. The good lamp should then flash approximately once each 3.2 seconds if the clock and counter of this embodiment are performing properly. The aforementioned sequence of events assures that the tester is performing properly up to this point. Any other single failure within the tester not checked by these tests, will cause an improper sequence of events to be displayed at some time during the logic tests. All test pulses provided during the testing operation and sent through the system are of such a short duration that the output devices, such as the under voltage coils and master relays, will not react to cause an undesired actuation within the plant. However, as an extra precaution, or if an alternative manual test is desired, bypass breakers may be employed to prevent the test signals from causing any undesired actuation.

The multiplexing mode switch is then set to the inhibit position so that confusing erroneous error signals generated during the test on one train, will not be sent to the control board and computer within the reactor control room. The input error inhibit switch 44 is then opened breaking the ground return for most contact inputs, such as the bistables designated by reference character 28 in FIG. 1, to remove existing error signals within the logic so that a complete test can be performed. The first selector switch located within the selector switch box 40 of FIG. 2 is then positioned to select a specific logic function, out of the plurality of logic functions located within the trip logic 21 of FIG. 1, to be tested. Four decks of selector switches connect the terminals A, B, C and D of the tester unit 36, as needed, to the appropriate inputs of the function under test. When the tester is ultimately connected, the testing unit will provide a sequence of simulated error signals through terminals A, B, C, and D to the logic function input under test. The resultant logic output will then be compared with a reference logic signal generated within the tester. Three more decks of switches are desirably provided to supply ground as needed through the system in order to remove the affects of circuitry not under test. One deck connects the $S_E$ switch to the logic function under test, either blocking or permitting operation of that function. In essence, the $S_E$ switch provides a simulated inhibit signal to the appropriate inhibit terminal of the logic circuitry described in copending application Ser. No. 241,038 (W.E. 42,844). When the $S_E$ switch is opened, the functions ability to cause actuation is tested. When the $S_E$ switch is closed the functions ability to be prevented is tested.

One deck of the selector switches connects the appropriate output of the logic function under test to the tester unit 36 so that the output can be compared with a reference signal generated within the tester. A voltmeter 46 is provided for visual observation of the logic output; zero volts always indicates an actuation signal. One deck of the selector switches provides ground to one terminal of the tester board which in turn grounds one terminal of the function type logic, to be described, and a lamp 48 indicating the type of function under test. A lamp is provided for each of the logic functions and one and only one lamp should be illuminated at a time. An optional manual test can be performed by utilizing various combinations of the manual pushbuttons 50 to introduce different permutations of error signals into the logic system 21. A semi-automatic test of the logic function connected can be accomplished by momentarily depressing the begin test button 42. The tester will then automatically check all possible combinations of input signals in less than 2 seconds while comparing the output signals of the circuit under test with a reference signal generated within the tester. If they compare at all times, the testing lamp will go out; the good lamp will come on; and the bad lamp will remain off. Any other sequence of events indicates a failure in either the logic or the tester.

If the test indicates that the logic function connected is operating properly, the selector switches can be turned to the next position to connect the next logic function to be tested.

After each circuit has been tested, all of the selector switches within the switching unit 40 are returned to their rest position, the R-S flip-flop memories within the tester are set to their correct states, and the input error inhibit switch 44 is closed completing the ground return for the contact inputs. The multiplexing mode switch is then returned to its normal position and the bypass breakers removed. If an error signal does not exist within the logic train just tested, it will operate normally and the other logic train can be tested in a similar manner.

A more detailed block diagram of the tester unit 36 is illustrated in FIG. 3. To simplify the explanation of this unit, most of the circuitry employed to implement the logic of FIG. 3 can be found within the corresponding area of the tester circuitry schematic provided within FIG. 5.

In general, the tester is designed such that the selector switches 40 select a function or portion of a function to be tested, which is any one of the basic seven logic functions 1/1, 1/2, 1/3, 1/4, 2/2, 2/3, 2/4. In doing this, the selector switches connect four outputs A, B, C, and D of the tester unit 36 to the appropriate inputs of the logic function under test; the undervoltage coil return of the tester unit to the output of the function under test; and ground to one of the seven input lines within the tester labeled $L_{1/1}$ through $L_{2/4}$, thus, informing the tester as to the type of function selected. The tester unit then generates all necessary combinations of error signals at the inputs of the function under test and compares its output to a reference signal generated within the tester unit. Any prolonged disagreement will result in a bad lamp being illuminated within the reactor control room and termination of the test. If all combinations of error signals are produced without disagreement, the test is terminated and the good lamp is illuminated. The tester testing lamp is maintained on during the test and is turned off when the appropriate inputs to the function under test are all zero at the same time (the last test).

A detailed illustration of the sub-units comprising the tester 36 is illustrated in FIG. 3 with the corresponding circuitry being illustrated in schematic form in FIG. 5. The function type logic 52 is a seven input, three output combinational circuit as illustrated in FIG. 5. At any given time, one and only one of the seven inputs ($L_{1/1}$ through $L_{2/4}$) will be a logical 0, producing a predetermined combination on the three outputs X, Y and Z. The appropriate inputs, $L_{1/1}$ through $L_{2/4}$, are connected to corresponding selector switches and the respective input terminals are grounded to correspond to the type of function under test. The outputs X, Y, and Z, convey this information, in $m/n$ notation, to the internal circuitry within the tester unit.

The X output conveys the m information to the 2/4 "OR" 1/4 logic unit 56, thus, informing the circuitry of the number of input error signals required by the logic circuit under test to command actuation. The Y and Z output lines inform the inhibit logic function 54 of the n information, thus, indicating the total number of inputs required by the function under test. Simulated error signals are then generated within the tester unit and are first presented on the A output, then the A and B output, etc., by the electronic switches 58 as the counter is stepped by the clock. The inhibit function 54 will stop the counter after the appropriate number of steps and inhibit the electronic switches 58 before the tester attempts to present error signals on outputs not connected to the function under test, but only after all necessary combinations of error signals have been presented on outputs that are connected to the function under test. The error signals sent to the logic under test are also sent to the 2/4 "OR" 1/4 circuit 56 to produce a reference signal, and to the all necessary output low circuit 66, which checks that the last combination of error signals needed in a test is indeed produced.

The output of the function under test is fed into a coincidence detector 62 via the selector switches and protection circuit 64. If there is ever a prolonged difference between the reference signal and the function under test, a flip-flop will be set within the coincidence detector lighting the bad lamp and stopping the counter. If all necessary combinations of error signals are produced without a difference between the function output and reference signal, the good lamp will come on, the testing lamp will go off and the counter will be stopped.

The waveforms provided by the tester are illustrated in FIG. 4. The basic clock signal is generated by a programmable unijunction transistor having a negative spike output as indicated by the graph designated by reference abbreviation PUT. The resultant clock pulse is designated by $C_1$. The clock pulse drives a counter with bit outputs $2^0$ through $2^6$ as indicated. A strobe signal E, generated by a combinational circuit having inputs from the clock and counter bits $2^0$ and $2^1$, together with the counter bits, form the inputs which drive the electronic switches 58 to produce the simulated error signals within the tester unit. The simulated error signals which form the inputs to the logic function under test, through output lines A, B, C and D, are also shown. The remaining four graphs illustrate the pulses generated responsive to the function type logic, to indicate when the tester is to cease supplying inputs to the logic function under test.

The function type logic 52 is a seven input three output combinational circuit constructed using diodes. The $L_{1/1}$ input is shown, for illustrative purposes, as having no internal connections. When no ground connection is applied to either of the other six terminals the function type logic will assume that the function under test is 1/4. The lamps that visually display which function is under test are connected at one end to a positive voltage supply and at the other end to their respective terminals $L_{1/1}$ through $L_{2/2}$. One and only one lamp should be on at a given time. If a diode should fail as a short (or some resistance so as to appear as a short), more than one lamp will be on. If a lamp is burned out, there will be some time during the test when the function type lamps are not illuminated. If a diode should fail as an open (or a high enough resistance to appear as a "one" logical input to the NAND gates), the tester will assume the function under test has more inputs than required and will inevitably light the bad lamp when errors are imposed on inputs that do not exist.

The inhibit logic 54 is constructed using NAND gates 70, 72, 74, 76, 78 and 80. It is a six input one output combinational circuit. Inputs are supplied from the outputs Y and Z and the counter bits, and the circuitry is programmed to monitor the right combination of counter bits and provide an output signal to stop the counter when the appropriate number of combinations have been tried. The output signals from the inhibit logic, which are illustrated on the four lower graphs in FIG. 4, are supplied to the good lamp through AND unit 84 and to the counter through OR unit 82. The Y and Z inputs from the function type logic 52, set the inhibit logic 54 to provide an output which is the inverse of the corresponding bit of the counter. In this way, the inhibit logic 54 can stop the counter before the tester attempts to place simulated error signals on inputs which do not exist. The logic block marked "OR" is produced by NAND gate 82 so that either the inhibit logic 54 or the coincidence detector 62 can stop the counter and inhibit the electronic switches 58 by presenting a logical one at the counter stop output, as shown in FIG. 5. The "AND" function 84 shown in the block diagram is constructed using NAND gate 86 and the discrete NAND gate 88 so that both the inhibit logic output and the all necessary outputs low logic 66 output must be present to light the good lamp. Should the inhibit logic or "OR" function fail in a manner so as to call for more error combinations than required, then there will be a prolonged difference between the logic function output and the reference signal at some time during the test, causing the bad lamp to be illuminated. If the inhibit logic should fail in a manner so as to call for fewer error combinations than are required, than the flipflop 90 within the all necessary outputs low logic 66 will not be set and the good lamp will not come on.

The inhibit logic provides an additional output through NAND gates 82 and 92 to the electronic switches to inhibit the electronic switches from providing further outputs on output lines A, B, C and D.

The electronic switches 58 are constructed utilizing NAND gates 92, 94, 96 and four discrete NANDS 98, 100, 102, and 104. They function to place all the necessary combinations of short duration simulated error signals on the appropriate inputs of the logic function under test as well as to provide inputs to the 2/4 "OR" 1/4 circuit 56 and the all necessary outputs low logic 66. The simulated error signals are generated by inverting four bits of the counter AND'ed with the one-millisecond strobe signal and the inversion of the counter stop. The resultant waveforms are illustrated in FIG. 4. If the counter fails to count or the discrete NAND gates fail as an open, the good lamp will not come on at some time during the test. If one of the outputs A, B, C and/or D is shorted or opened erroneously, the bad lamp will be illuminated. If one of the discrete NANDS should fail as a short, the tester testing lamp, good lamp and bad lamp will all be off at the same time.

The 2/4 "OR" 1/4 logic 56 is a six input, one output combinational circuit similar to the circuits employed in the universal card illustrated in application Ser. No. 241,038 (Westinghouse Case 42,844). Essentially the 2/4 "OR" 1/4 logic 56 comprises a 2/4 circuit wire OR'ed with a 1/4 circuit. The 1/4 circuit is inhibited by the X output of the function type logic so that the resulting reference signal is either 1/n or 2/n, depending on the number of combinations produced by the counter. The 1/4 circuit is constructed utilizing NAND gates 106 and 108 while the 2/4 circuit is constructed utilizing NAND gates 110, 112, 114, 116, and 118. Additionally, both the 1/4 and 2/4 circuits can be inhibited by placing a logical 1 input at the inhibit input 120, causing the reference signal generated at the output 122 to always be a logical one. The conventions assumed are that an input error signal and an output actuation command are represented by a logical zero. Should the 2/4 or 1/4 circuit fail in any way, there will be an eventual prolonged difference between the reference signal and the output of one of the circuits under test so that the bad lamp will eventually illuminate.

The protection circuit 64 is constructed using a Zener diode and diode combination which functions to protect the coincidence detector from noise. Should it fail to properly transmit the output of the function under test, there will eventually be a bad lamp illuminated.

The coincidence detector 62, with memory R-S flip-flop 124, is constructed utilizing NAND gates 126, 128, 130, 132, 134, 136 and the discrete NAND gate using transistors 138 and 140. When the difference between the output of the function under test and the reference signal occurs for longer than the delay provided by the low pass filter $R_1$ and $C_1$, the difference is memorized by the R-S flip-flfop 124 which illuminates the bad lamp and stops the counter through the logic "OR" block 82. The ability of the coincidence detector to detect the difference between the reference and the function output signal is tested in the first position of the first selector switch. Since no function is tested in this position, the conduction of a semi-automatic test should yield a bad lamp if the inhibit input 120 is zeroed (i.e. by grounding).

The all necessary outputs low logic 66 is an eleven output, one output circuit composed of diodes 146 through 176, NAND gate 178 and the discrete NAND utilizing transistors 180 and 182. A flip-flop 90 is provided which is initially reset and waits for the correct total number of tester output signals to become a logical zero, all at the same time, before setting. Since the last combination of simulated error signals to be produced will be zero, this circuitry assures that the counter has been allowed to progress as far as is necessary to produce all required combinations. In this way, the all necessary outputs low logic 66 performs a check on the inhibit logic 54 discussed previously. The tester testing lamp will not go out and the good lamp will not come on until the R-S flip-flop 90 is set. If diodes 146 through 170 fail as an open, the R-S flip-flop will not be set and the good lamp will not come on. If they fail as a short, the light emitting diodes 68 in the level detector 86 will not come on during the initial testing procedure previously described. If diodes 172 through 176 fail as an open, the light emitting diodes 68 in the level detector 86 will not go off when the begin test pushbutton is depressed. If diodes 172 through 176 fail as a short, the tester testing lamp and the good lamp will both be on at the same time momentarily. The R-S flip-flop is checked while in position one of the first selector switch, as previously described.

The level detector 86 is a five input one output circuit which serves as a final check on the tester as a whole. Additionally, the level detector can be employed in improved systems to check the continuity of wires from the logic to the input isolation devices. The nominal threshold of each level detector in the exemplary circuitry illustrated is approximately 25 volts. When any or all of the inputs is above the threshold, the current flowing through the light emitting diodes 68 causes them to emit red light and results in a logical zero output.

The AND logical block 84 receives inputs from both the inhibit logic and coincidence detector and if both inputs agree, provides an output to the good lamp. The NOT logical block is merely provided to invert the all necessary outputs low logic signal and provide a signal of proper polarity for the testing lamp.

Thus, the tester of this invention reduces the time required to perform the reliability tests on the two logic trains, enabling more frequent tests of the system. Additionally, a more complete test of the overall logic system is made available than has previously been possible, resulting in less confusion to the reactor plant operator and less potential of an undesired actuation of the safeguards and protection mechanisms.

I claim as my invention:

1. A tester for sequentially testing the operation of a plurality of logic circuits respectively connected to perform a number of different predetermined logic functions each having n inputs, where n is a predetermined integer, operably arranged so as to provide an output signal of a first state whenever at least m of said n inputs assume said first state, where m is a predetermined integer less than or equal to n and where n and m can vary between each of the separate predetermined logic functions, comprising:

reference signal generating circuit means for providing a reference input signal to said n inputs of the predetermined logic function under test;

circuit means for simulating the predetermined logic function under test, having corresponding inputs from said reference signal generating means and responsive to said reference input signal to produce a logic reference signal;

circuit means for comparing the outputs from the predetermined logic function under test with said logic reference signal and for providing an alarm signal when a difference is indicated; and means for switching the inputs of the tester connected to the logic function under test to the next of the sequence of the plurality of logic circuits to be tested, after the test on the circuit being tested is completed and simultaneously programming said reference signal generating means and said simulating means to respectively provide said reference input signal and logic reference signal corresponding to the next of the sequence of the plurality of logic circuits to be tested.

2. The tester of claim 1 wherein said reference signal generating means sequentially provides a plurality of combinations of said reference input signal to said logic function and said logic simulation means.

3. The tester of claim 2 wherein said plurality of combinations of said reference input signal includes all possible permutations and combinations of said n inputs.

4. The tester of claim 2 wherein said reference signal generating means ceases sequencing said plurality of combinations of said reference input signal upon an alarm signal from said comparing means.

5. The tester of claim 1 including detecting means connected to each of said circuit means for indicating a malfunction in the tester.

6. The tester of claim 1 wherein said predetermined logic function includes an inhibit function to prevent the output thereof from assuming said first state including means for testing the proper operation of said inhibit function.

7. The tester of claim 5 wherein said detecting means is effective to indicate a malfunction in the sequence of internal operation of any one of said circuit means.

* * * * *